United States Patent
Palmer

(10) Patent No.: US 10,933,925 B2
(45) Date of Patent: Mar. 2, 2021

(54) VEHICLE UNDERBODY

(71) Applicant: Dr. Ing. h.c. F. Porsche Aktiengesellschaft, Stuttgart (DE)

(72) Inventor: Eberhard Palmer, Vaihingen/Enz (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 16/245,291

(22) Filed: Jan. 11, 2019

(65) Prior Publication Data
US 2019/0210667 A1 Jul. 11, 2019

(30) Foreign Application Priority Data
Jan. 11, 2018 (DE) .................. 10 2018 100 503.2

(51) Int. Cl.
*B62D 35/02* (2006.01)
*B62D 25/20* (2006.01)
*B62D 21/00* (2006.01)

(52) U.S. Cl.
CPC ............. *B62D 35/02* (2013.01); *B62D 25/20* (2013.01); *B62D 25/2072* (2013.01); *B62D 21/00* (2013.01)

(58) Field of Classification Search
CPC ............ B62D 25/2018; B62D 25/2027; B62D 29/041; B62D 35/02; B60G 2204/4308; B60G 2206/10; B60G 2206/8207; B60G 3/20; B60G 7/001
USPC ... 296/180.1, 180.4, 187.09, 100.03, 136.04, 296/76, 39.2, 37.7; 301/104, 37.41; 29/408, 428, 446, 894.3
See application file for complete search history.

(56) References Cited

U.S. PATENT DOCUMENTS

| | | | | |
|---|---|---|---|---|
| 7,845,709 B2* | 12/2010 | Browne | ............... | B62D 25/182 296/180.5 |
| 9,643,664 B2* | 5/2017 | Tesch | ............... | B62D 35/02 |
| 9,855,984 B2* | 1/2018 | Tesch | ............... | B62D 35/02 |
| 2011/0309652 A1* | 12/2011 | Eichentopf | ........... | B60G 7/001 296/180.1 |
| 2016/0096560 A1* | 4/2016 | Koremoto | ............. | B60J 5/0415 296/180.1 |
| 2016/0280284 A1 | 9/2016 | Scholz et al. | | |

FOREIGN PATENT DOCUMENTS

EP 0 888 956 1/1999

OTHER PUBLICATIONS

Great Britain Combined Search and Examination Report dated Jun. 25, 2019.

* cited by examiner

*Primary Examiner* — D Glenn Dayoan
*Assistant Examiner* — Sunsurraye Westbrook
(74) *Attorney, Agent, or Firm* — Gerald E. Hespos; Michael J. Porco; Matthew T. Hespos

(57) ABSTRACT

A vehicle underbody (1) has an underbody paneling (6) with at least one opening (3) for the at least temporary extension of a rear axle link (5) therethrough. The opening (3) is covered by a shiftable flap (4) and at least one a force accumulator (9) that biases the flap (4) toward a position for covering the opening (3). The flap (4) can be shifted counter to a restoring force of the force accumulator (9) to at least temporarily open the opening (3).

10 Claims, 2 Drawing Sheets

VEHICLE UNDERBODY

CROSS REFERENCE TO RELATED APPLICATION

This application claims priority under 35 USC 119 to German Patent Appl. No. 10 2018 100 503.2 filed on Jan. 11, 2019, the entire disclosure of which is incorporated herein by reference.

BACKGROUND

Field of the Invention

The invention relates to a vehicle underbody with an opening, in particular an opening in a rear axle link of a motor vehicle.

Related Art

An aerodynamic configuration is becoming ever more important in motor vehicles. It is thus advantageous for a favorable drag coefficient if a vehicle underbody can be covered as completely as possible to achieve a favorable airflow under the vehicle and a favorable drag coefficient. However, two opposite openings are provided in the region of the rear axle links. These openings enable the rear axle links to be deflected in response to chassis movements or on the lifting platform when the motor vehicle has fully decompressed. These openings are necessary for chassis movement, but lead to pronounced air vortices and thus constitute an aerodynamically unfavorable region of the underbody.

It is an object of the invention to provide a vehicle underbody and a motor vehicle having such a vehicle underbody to achieve better aerodynamics.

SUMMARY

The invention relates to a vehicle underbody having an underbody paneling with at least one opening for at least temporary extension of a rear axle link therethrough. The opening is covered by a shiftable flap that can be shifted counter to the restoring force of a force accumulator to at least temporarily open the opening. Accordingly, the force accumulator acts on the flap unless the flap is pushed open counter to the restoring force of the force accumulator, for example by a rear axle link. This opening takes place only in special operating conditions. Thus, the opening is closed in most operating situations during the normal driving mode, but the opening can be opened in certain situations to provide more movement clearance for the rear axle link.

In one embodiment, the flap is coupled to the underbody paneling so as to be rotatable about an axis of rotation. Thus, the flap is positionally stable and can pivot only about the defined axis, i.e. can open or close the opening by pivoting.

At least one force accumulator may be arranged between the flap and the underbody and acts upon the flap in such a manner that the flap closes the opening. Thus, the flap is urged into the closed position without further action of force, for example by means of a rear axle link. The flap is opened or pivoted into an open position if a rear axle link exerts an additional force that is greater than the force of the force accumulator. With this configuration, the flap is closed in the typical operating conditions and therefore improves the aerodynamics of the motor vehicle. It may be assumed that the driving speed of the motor vehicle is low during operating conditions where rear axle links are extended by a good distance, and therefore the aerodynamic influences also are low.

The force accumulator may be a leaf spring that is coupled to the flap and to the underbody paneling or to the vehicle underbody. The leaf spring saves construction space and has an approximately linear characteristic, which simplifies the loading and movement of the flap.

The leaf spring may form a V-shape with a first arm connected to the flap and a second arm connected to the underbody paneling. This configuration offers saving on construction space.

The flap may have a flat flap surface and two side surfaces perpendicular thereto. The axis of rotation may lie in the flat flap surface or may be parallel thereto. This improves the aerodynamics and increases the rigidity of the flap.

Each side surfaces oriented perpendicular to said flat flap surface may have a protruding collar on which the respective force accumulator is supported. A construction-space-saving arrangement of the force accumulator or force accumulators can thereby take place.

The protruding collar may form a channel on which the force accumulator is supported to achieve a secure arrangement of the force accumulator, particularly in the case of leaf springs. The collar also can form a labyrinth seal if a web of the underbody paneling engages in the collar. This also improves the aerodynamics.

The flap may be made of plastic. A plastic flap is less expensive than a metal flap and is easier to form. Additionally, a plastic flap is lighter than a metal flap and therefore can be acted upon with simpler force accumulators.

The invention also relates to a motor vehicle having a vehicle underbody with two openings, and each of the openings is closable by a flap.

The invention is explained in detail below using an exemplary embodiment with reference to the drawings.

DETAILED DESCRIPTION

Figure 1:
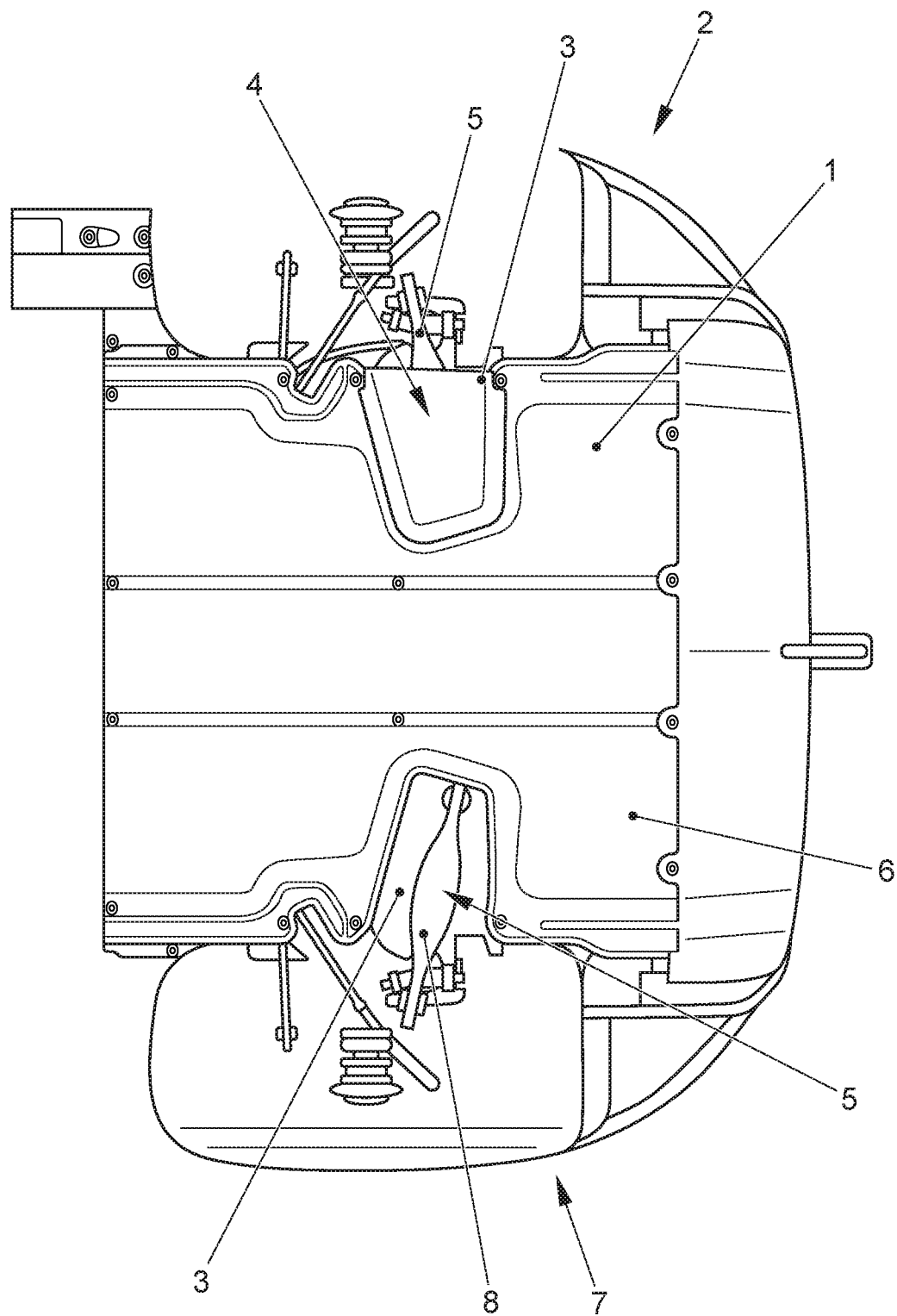
FIG. 1 is an illustration of an underbody of a motor vehicle from below.

FIG. 1 shows an illustration of a vehicle underbody 1 of a motor vehicle 2 from below. The top of the image of FIG. 1 shows an opening 3 that is closed by a flap 4, while the bottom of the image of FIG. 1 does not illustrate the flap so that the opening 3 in the vehicle underbody 1 can be seen clearly. The opening 3 in the underbody 1 or in an underbody paneling 6 defines a movement space of a rear axle link 5 of the rear axle or of the rear wheel suspension of the motor vehicle 2.

Figure 2:
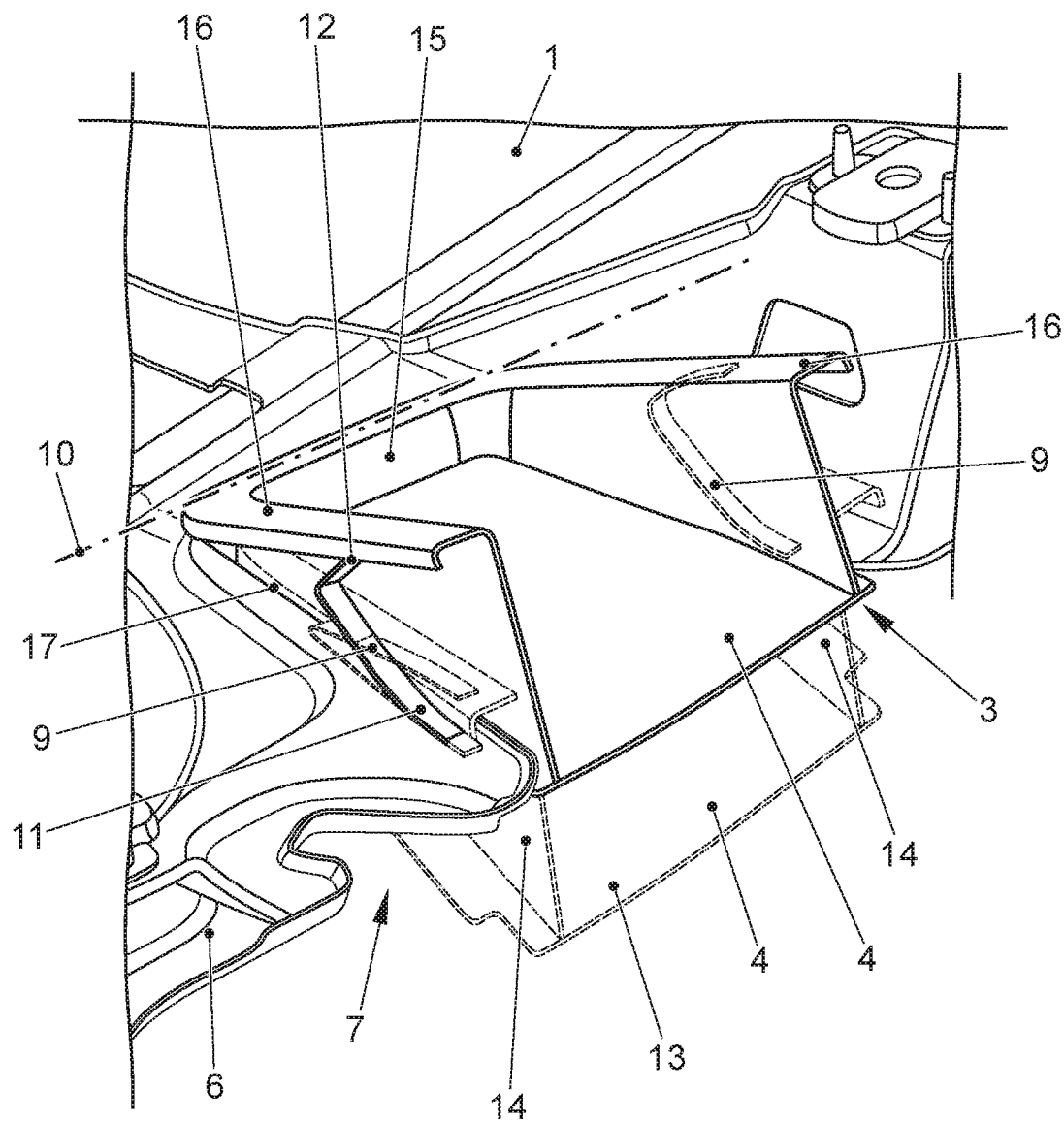
FIG. 2 is a perspective view of an underbody with an opening for a rear axle link and with a flap for covering the opening.

FIG. 2 is a perspective view of a vehicle underbody 1 with an opening 3 for a rear axle link 5 of FIG. 1 and with a flap 4 for covering the opening 3. Two different positions of the flap 4 are illustrated.

The vehicle underbody 1 is provided with an underbody paneling 6 so that the vehicle underbody is smooth and closed as much as possible to minimize turbulence of the airflow under the motor vehicle 2.

The underbody paneling 6 and the vehicle underbody 1 have at least one opening 3 in the region 7 of the rear axle 8 for at least temporary extension of a rear axle link 5 therethrough. Therefore, the rear axle link 5 reaches or does not reach through the opening 3, depending on the driving state of the motor vehicle 2.

A flap 4 is provided on the opening 3 to cover the opening 3 when the rear axle link 5 does not reach through the opening. The flap 4 opens the opening 3 when the rear axle link 5 reaches through the opening 3. More particularly, the flap 4 can be shifted counter to the restoring force of a force accumulator 9 to at least temporarily open the opening 3. At least one force accumulator 9, such as a spring, is provided. The force accumulator 9 is supported on the flap 4 and on the underbody paneling 6 or on the vehicle underbody 1, part of which is the underbody paneling. The force accumulator 9 is arranged and pretensioned in such a manner that the flap 4 is urged into the closed position without further application of force, for example by means of the rear axle link 5, and therefore the opening 3 is closed by the flap 4. If the rear axle link 5 is moved into the opening 3, the rear axle link 5 presses against the flap 4 to urge and shift the flap 4 counter to the restoring force of the force accumulator 9 into an open position.

FIG. 2 shows the flap 4 in two positions. In the upper position, the opening 3 is closed by the flap 4 and, in the lower position, the opening 3 is opened up by the downwardly folded flap 4.

It can be seen in FIG. 2 that the flap 4 is coupled to the underbody paneling 6 or to the vehicle underbody 1 so as to be rotatable about an axis of rotation 10. The axis of rotation 10 is arranged in this embodiment on the inner side of the opening 3, i.e. toward the vehicle center axis, and therefore the axes of rotation 10 of opposite openings 3 are arranged adjacent to each other.

The flap 4 is acted upon by at least one force accumulator 9 that is arranged between the flap 4 and the vehicle underbody 1 and acts upon the flap 4 in such a manner that the flap 4 closes the opening 3. The embodiment of FIG. 2 has two force accumulators 9 in the form of leaf springs. The two force accumulators 9 are spaced apart from each other along the axis of rotation 10. In the embodiment of FIG. 2, each force accumulator 9 is a leaf spring that is coupled to the flap 4 and to the underbody paneling 6 or to the vehicle underbody 1.

In the illustrated embodiment, the leaf spring 9 is V-shaped with first and second arms 11, 12. The first arm 11 is connected or coupled to the underbody paneling 6 or to the vehicle underbody 1, while the second arm 12 is connected or coupled to the flap 4. As a result, the leaf spring 9 can be arranged in a small construction space.

Furthermore, the flap 4 has a flat flap surface 13 and two side surfaces 14 oriented perpendicular to the flat flap surface 13. The axis of rotation 10 lies in the flat flap surface 13 or is arranged parallel thereto. The flap therefore forms a type of channel to prevent an inflow from the direction of the side surfaces 14. A rear vertical side surface 15 connects the two side surfaces 14.

FIG. 2 also shows that the two perpendicularly oriented side surfaces 14 and the vehicle side surface 15 have a protruding collar 16 on which the force accumulators 9 are supported. The protruding collar 16 forms a channel on which the respective force accumulators 9 are supported. A rib 17 protrudes from the underbody paneling 6 in the direction of the collar 16 and forms a labyrinth seal together with the channel-shaped collar 16.

The flap advantageously is composed of a plastic, such as polycarbonate, polypropylene, polyamide or the like. The flap 4 can also be composed of metal, for example of aluminum.

The motor vehicle therefore has a vehicle underbody 1 with two openings 3. The vehicle underbody 1 is configured such that the openings 3 are closable by one flap 4 per opening 3.

LIST OF REFERENCE SIGNS

1 Vehicle underbody
2 Motor vehicle
3 Opening
4 Flap
5 Rear axle link
6 Underbody paneling
7 Region
8 Rear axle
9 Force accumulator
10 Axis of rotation
11 Arm
12 Arm
13 Flap surface
14 Side surface
15 Side surface
16 Collar
17 Rib

What is claimed is:

1. A vehicle underbody comprising: an underbody paneling and at least one opening in the underbody paneling for at least temporary extension of a rear axle link therethrough; a shiftable flap having a flap panel movable between a closed position for covering the opening and an open position for opening the opening, the shiftable flap further having side walls projecting up from the flap panel and movable in the opening as the shiftable flap moves between the closed position and the open position, and a collar projecting out from the side walls and being above areas of the underbody paneling adjacent the opening; and at least one force accumulator disposed between the collar and the underbody paneling for exerting forces on the collar and biasing the flap toward the closed position.

2. The vehicle underbody of claim 1, wherein the flap is coupled to the underbody paneling or to the vehicle underbody so as to be rotatable about an axis of rotation.

3. The vehicle underbody of claim 1, wherein the at least one force accumulator is a leaf spring that is coupled to the collar of the flap and to the underbody paneling.

4. The vehicle underbody of claim 3, wherein the at least one leaf spring is V-shaped and has a first arm coupled or connected to the underbody paneling and a second arm coupled or connected to the collar of the flap.

5. The vehicle underbody of claim 2, wherein the flap panel has a flat flap surface and the two side walls of the flap are perpendicular to the flat flap surface, the axis of rotation being in or parallel to the flat flap surface.

6. The vehicle underbody of claim 5, wherein the side walls comprise front and rear side walls and the collar protrudes out from the front and rear side walls, the at least one force accumulator comprises front and rear force accumulators adjacent the front and rear walls and supported between the collar and the underbody paneling.

7. The vehicle underbody of claim 6, wherein the protruding collar forms a channel in which the respective force accumulator is supported.

8. The vehicle underbody of claim 1, wherein the flap is composed of a plastic.

9. A motor vehicle, comprising:
a vehicle underbody with an underbody paneling having two openings for at least temporary extension of a rear axle link therethrough;
shiftable flaps, each of which has a flap panel is movable between a closed position for covering the respective opening and an open position for opening the respective opening, the shiftable flap further having side walls projecting up from the flap panel and movable in the opening as the shiftable flap moves between the closed position and the open position, and a collar projecting out from the side walls and being above areas of the underbody paneling adjacent the opening; and
force accumulators disposed between the collar and the underbody paneling for exerting forces on the collar and biasing the respective flap toward the closed position.

10. The vehicle underbody of claim 7, wherein the underbody paneling comprises a rib projecting up adjacent to the at least one opening, the at least one force accumulator having a first end connected to the underbody paneling substantially adjacent the rib and a second end in the channel of the protruding collar.

\* \* \* \* \*